United States Patent [19]

Nagumo et al.

[11] Patent Number: 4,545,333

[45] Date of Patent: Oct. 8, 1985

[54] SYSTEM FOR CONTROLLING COOLANT TEMPERATURE OF INTERNAL COMBUSTION ENGINE

[75] Inventors: Shinichi Nagumo; Yoshio Toda, both of Yokohama; Yasuo Nakajima, Yokosuka; Yoshifumi Hase, Yokohama, all of Japan

[73] Assignee: Nissan Motor Co., Ltd., Yokohama, Japan

[21] Appl. No.: 617,741

[22] Filed: Jun. 6, 1984

[30] Foreign Application Priority Data

Jun. 8, 1983 [JP] Japan .................................. 58-101950

[51] Int. Cl.[4] .............................................. F01P 7/16
[52] U.S. Cl. .................................. 123/41.02; 123/41.1
[58] Field of Search ............... 123/41.02, 41.08, 41.09, 123/41.1, 41.44; 236/34, 34.5

[56] References Cited

U.S. PATENT DOCUMENTS

| 4,381,736 | 5/1983 | Hirayama | 123/41.1 |
| 4,399,776 | 8/1983 | Shikata | 123/41.08 |
| 4,484,541 | 11/1984 | Yokoyama | 123/41.1 |

FOREIGN PATENT DOCUMENTS

| 3216048 | 11/1982 | Fed. Rep. of Germany . | |
| 3302768 | 8/1983 | Fed. Rep. of Germany . | |
| 2099572 | 12/1982 | United Kingdom | 123/41.1 |

Primary Examiner—William A. Cuchlinski, Jr.
Attorney, Agent, or Firm—Schwartz, Jeffery, Schwaab, Mack, Blumenthal & Evans

[57] ABSTRACT

A system for controlling a coolant temperature of an internal combustion engine comprises means for detecting operating condition of an engine, means for setting a different target coolant temperature for the detected operating condition, a flow control valve disposed in a coolant recirculating passage, and means for effecting a feedback control of opening degree of said flow control valve in such a manner as to adjust the actual coolant temperature toward the target coolant temperature.

7 Claims, 10 Drawing Figures

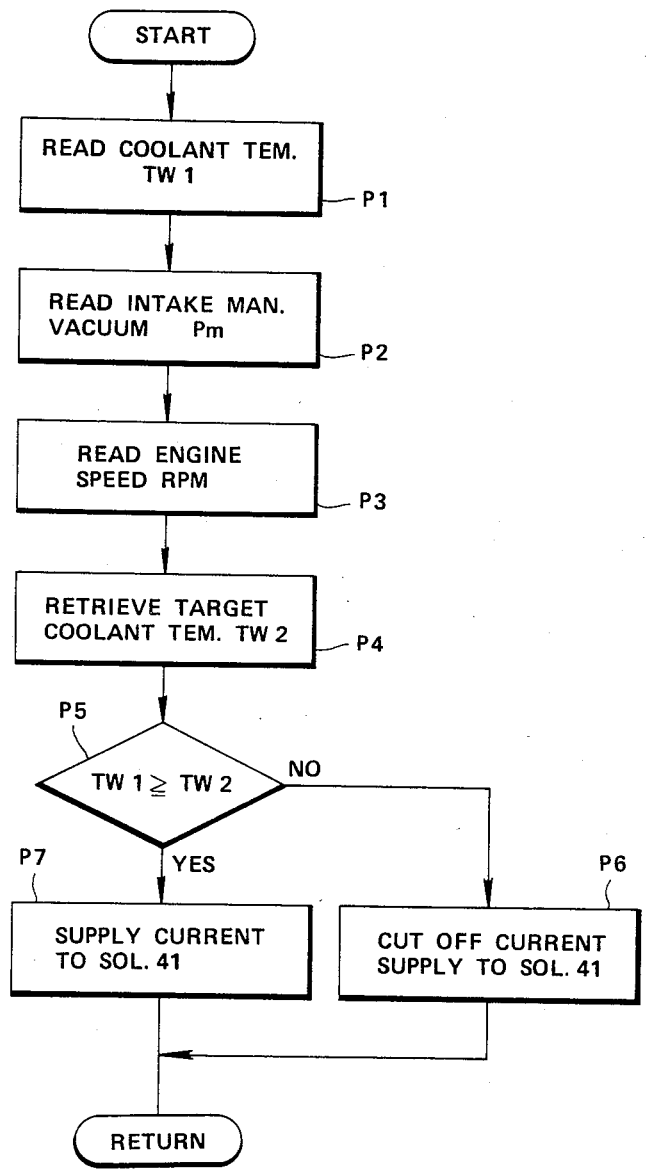

SYSTEM FOR CONTROLLING COOLANT TEMPERATURE OF INTERNAL COMBUSTION ENGINE

BACKGROUND OF THE INVENTION

The present invention relates to a system for controlling a coolant temperature of an internal combustion engine, and more particularly to a closed loop system for adjusting the temperature of a coolant to a target value which varies in response to operating conditions of the engine.

In widely used automotive internal combustion engines, in order to control a coolant temperature, a thermostat valve, which is designed to be opened at a predetermined temperature, for example 80° C., is disposed in a coolant circulating circuit including a radiator. In this case, the coolant is kept at around the predetermined temperature of 80° C.

Recently, attention has been paid to a control apparatus for keeping the coolant at different temperatures by varying the valve opening temperature of the thermostat valve in response to operating conditions of an engine.

According to this control apparatus, when an engine operates with a low load where thermal load is small with the least possibility of causing the engine to overheat, the thermostat valve opening temperature is raised to elevate the coolant temperature, thereby improving fuel economy and the exhaust gas purification. When the engine operates with a high load, the thermostat valve opening temperature is lowered to drop the coolant temperature, preventing the occurrence of knocking and enhancing "volumetric efficiency," thereby increasing power output of the engine.

One control apparatus falling into the above category is disclosed in Japanese Utility Model Application Provisional Publication No. 54-142722, which will be described referring to FIG. 1.

In a coolant passage 1, a thermostat 2 is disposed. The thermostat 2 operates as follows: When the coolant temperature rises, wax contained inside the thermostat 2 is expanded, thereby pushing a piston 3 upwardly as viewed in FIG. 1. This upward movement of the piston 3 is prevented when the piston 3 abuts a receiving portion 8 of a control rod 7 of a diaphragm device 6. Thus, a further projection of the piston 3 out of the thermostat 2 causes a valve 4 to disengage from a valve seat 12 against a return spring 5. If the control rod 7 is displaced upwards as viewed in FIG. 1, the piston 3 has to project further out of the thermostat 2 until the valve 4 starts to disengage from the valve seat 12.

Therefore, when the control rod 7 is lifted by the diaphragm 9, the valve 4 will not be opened until the coolant temperature rises further and the piston 3 is extended further. This causes an increase in the temperature of the coolant.

Intake manifold vacuum is admitted to a vacuum chamber 10 of the diaphragm device 6 acting on the diaphragm 9 in such a manner as to lift the diaphragm 9 against a diaphragm spring 11.

Since the intake manifold vacuum is high during engine operation with low load and low during engine operation with high load, the control rod 7 is lifted further, as viewed in FIG. 1, during engine operation with low load.

In this manner, the temperature at which the valve 4 is opened increases during engine operation with low load, whereas this temperature decreases during engine operation with high load. This causes the coolant temperature to rise during low load operation and drop during high load operation. If it is desired to increase the coolant temperature, a diaphragm spring 11 with a large spring force must be used because it acts on the diaphragm 9 against a reaction force which is applied to the diaphragm 9 via the control rod 7 when the valve 4 is pressed downwards against the return spring 5. On the other hand, the diaphragm 9 on which intake manifold vacuum acts against the diaphragm spring 11 must have a large pressure acting area, resulting in an increase in size and weight of each of the associated component parts. Therefore, if it is desired to set the coolant temperature high, the manufacturing cost increases. Besides, the operating life is short because the component parts are subjected to engine vibrations.

Another problem is that even though it is possible to vary the coolant temperature in response to a change in engine load, it is impossible to vary the coolant temperature in response to engine speed. Thus, this known control apparatus fails to meet a demand that the coolant temperature should drop as the engine speed increases even with the same engine load.

Referring to FIGS. 2 and 3, two well known ways of installing a thermostat are described. FIG. 2 shows a so-called "outlet control" and FIG. 3 shows a so-called "inlet control".

Referring to FIG. 2, a thermostat valve 2A is disposed in an outlet passage 15 which passes a relatively hot coolant, having cooled an engine main body 13, toward a radiator 14. A bypass passage 16, i.e., a passage bypassing the radiator 14, branches off from a portion upstream of this thermostat valve 2A and is connected to an intermediate portion of an inlet passage 18 which passes therethrough a relatively cool coolant having its heat dissipated after passing through the radiator 14 toward a water jacket (not shown) of the engine main body 13 via a water pump 17.

With this control arrangement, if the valve opening temperature of the thermostat valve 2A is set high, a difference between a temperature when the thermostat 2A is opened and a temperature when the thermostat 2A is closed increases as shown in FIG. 4, increasing the occurrence of a so-called hunting phenomenon.

Referring to FIG. 3, a thermostat valve 2B is disposed in an inlet passage 18 at a position immediately upstream of a junction where a bypass passage 16 joins with the inlet passage 18. Since the thermostat valve 2B senses the temperature of coolant resulting from mixing a relatively cool coolant having its heat dissipated via a radiator 14 with a relatively hot coolant coming from the bypass passage 16, the occurrence of the hunting phenomenon as mentioned before decreases. However, with this arrangement, because suction created by a water pump 17 acts on the thermostat valve 2B in a valve opening direction, the spring constant and the spring load of a valve return spring have to be set sufficiently high in order to prevent overcooling of coolant. To meet this requirement, the thermostat valve 2B has to use a large diaphragm device.

SUMMARY OF THE INVENTION

The present invention provides a coolant temperature control system for an internal combustion engine which can adjust coolant temperature accurately to different temperatures preset for various engine operating conditions in order to enhance fuel economy, exhaust gas purification and engine operation performance and which allows the use of a compact control actuator (diaphragm device).

According to the present invention, the coolant temperature can be adjusted accurately to different target temperatures by means of a control system which comprises sensors for detecting operating condition of the engine, means for generating a target temperature for the detected operating condition, a temperature sensor for sensing an actual coolant temperature of the coolant, and means for controlling the flow rate of coolant passing through a radiator in such a manner as to decrease a difference between the actual and target coolant temperatures.

BRIEF DESCRIPTION OF THE DRAWINGS

FIG. 8 is a flowchart showing a control routine executed by the controller;

DETAILED DESCRIPTION OF THE INVENTION

Referring to FIGS. 5 to 9, the first embodiment according to the present invention is described.

Figure 1:
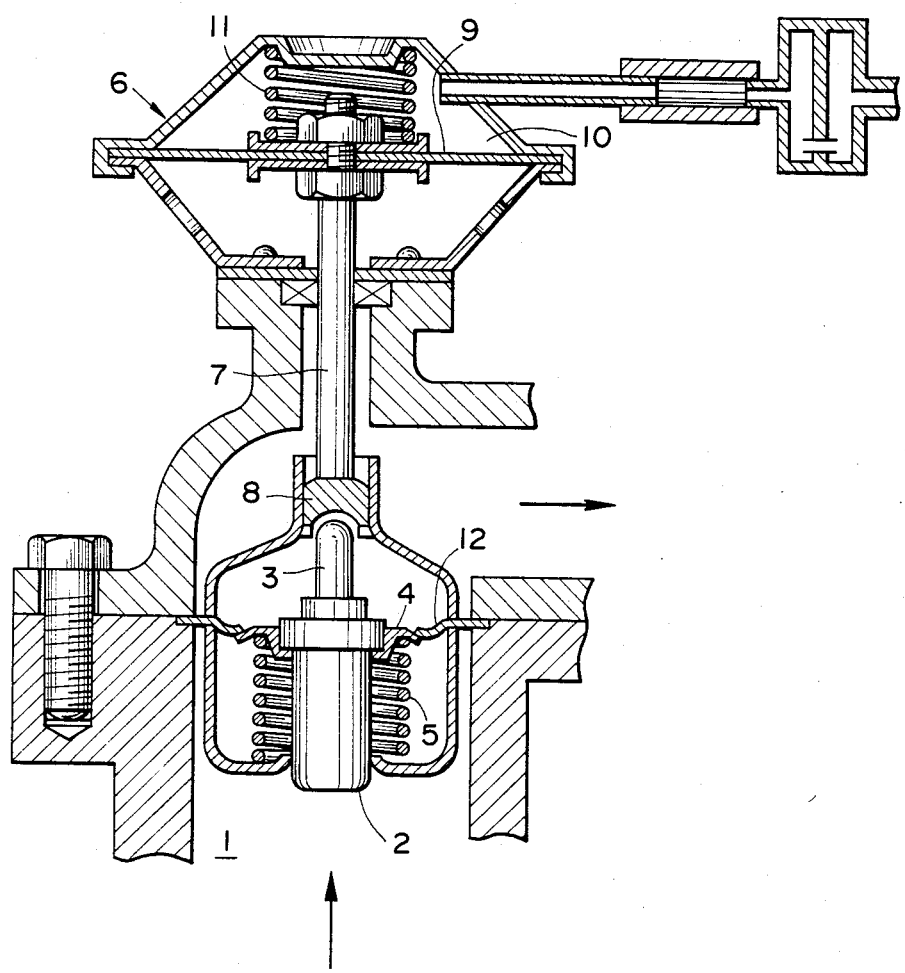
FIG. 1 is a sectional view of a prior art coolant temperature control apparatus.
Figure 2:
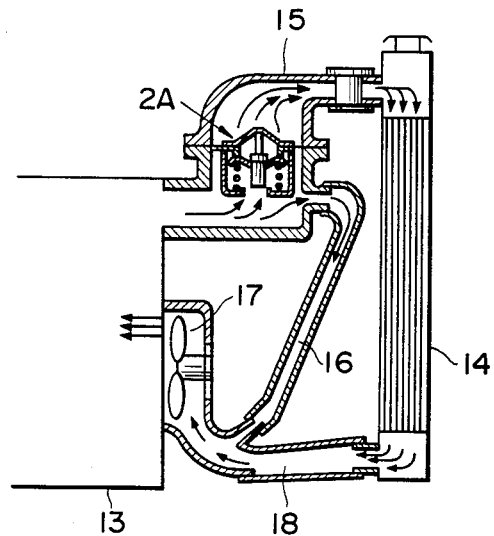
FIGS. 2 and 3 are schematic sectional views showing two examples of arranging a thermostat controlled valve in a coolant circulating circuit.
Figure 3:
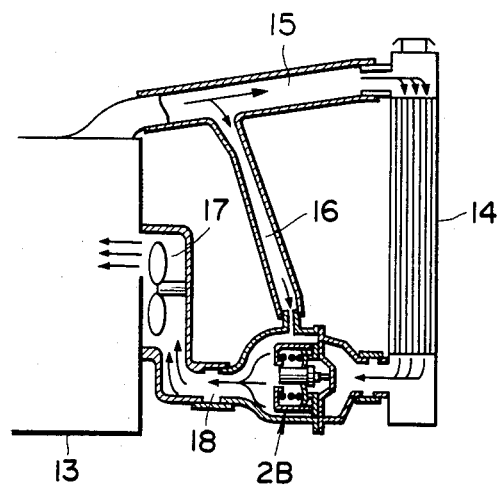
Figure 4:
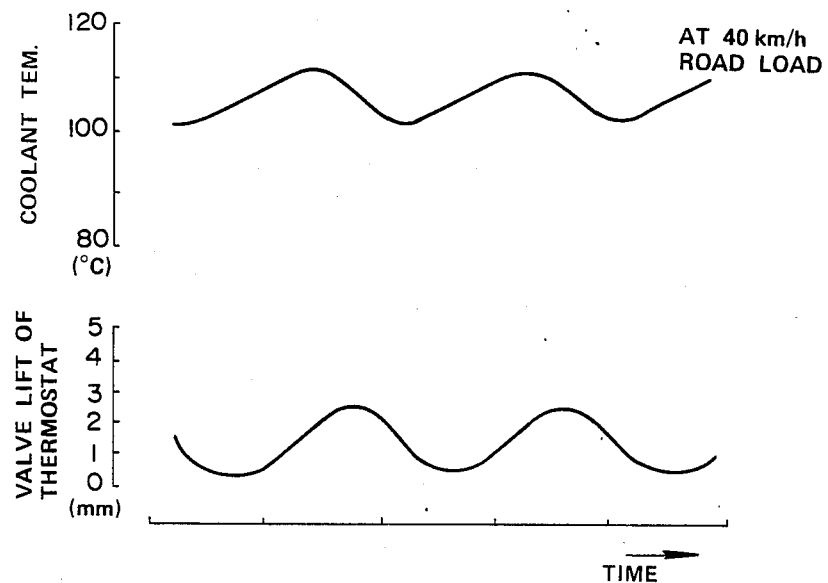
FIG. 4 shows graphs of a variation in coolant temperature vs. time along with a variation in valve lift vs. time which are obtained with the FIG. 2 control arrangement during operation at 40 km/h with raod load.
Figure 9:
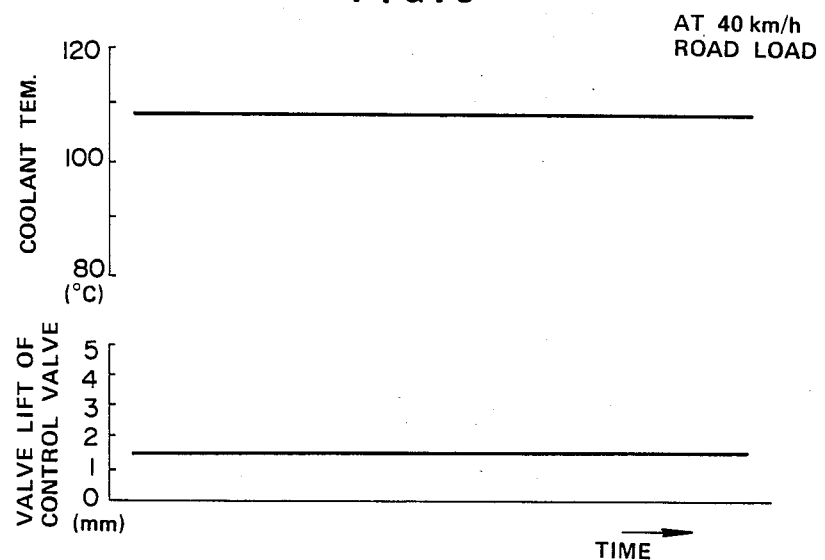
FIG. 9 shows graphs, similar to FIG. 4 of a control characteristic obtained by the system according to the present invention.
Figure 5:
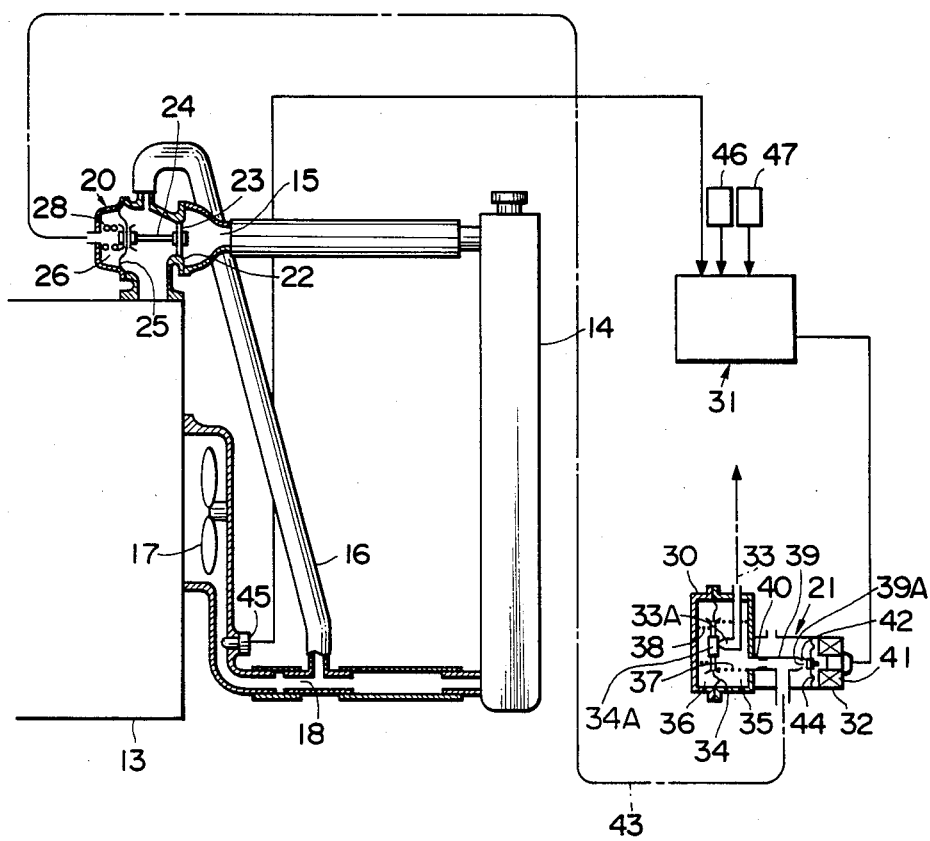
FIG. 5 is a schematic, partly sectioned, view showing a first embodiment of a system according to the present invention.

Referring first to FIG. 5, a flow control valve 20 is disposed in an outlet passage 15 at a position immediately downstream of a junction where a bypass passage 16 branches off from the outlet with the inlet passage 15.

The outlet passage 15 receives a relatively hot coolant having passed through an engine main body 13 and admits same to a radiator 14 where the heat is dissipated from the coolant. The relatively cool coolant from the radiator 14 is allowed to flow through an outlet passage 18 into the engine main body 13 under the action of a water pump 17. A bypass passage 16 has one end connected to the inlet passage 15 and an opposite end connected to the outlet passage 18 to bypass the radiator 14. Therefore, outlet passage 15, radiator 14, inlet passage 18, bypass passage 16, and water pump 17 define at least part of a coolant circulating circuit.

The flow control valve 20 is of a vacuum actuated type and operable in response to a vacuum regulated by a vacuum regulator 21. The flow control valve 20 includes, a valve element 23 connected to a diaphragm 25 via a rod 24 and a spring 28 biasing the valve element 23 in a valve opening direction. The valve element 23 cooperates with a seat portion 22 formed in the outlet passage 15 to open or close the outlet passage 15.

The diaphragm 25 has a righthand side thereof, as viewed in FIG. 5, exposed to the coolant discharged from the water pump 17 and a lefthand side thereof, as viewed in FIG. 5, defining a vacuum chamber 26 which communicates with the vacuum regulator 21. The spring 28 is disposed in the vacuum chamber 26 and has one end bearing on the diaphragm 25 so as to bias the valve element 23 in the valve opening direction.

The vacuum regulator 21 comprises a pressure regulating unit 30 for keeping engine intake manifold vacuum supplied thereto at a predetermined value (such as, −120 mmHg), and a solenoid unit 32 for modifying the vacuum on which the flow control valve 20 is operable in response to an electric signal supplied by a later described controller 31.

Intake manifold vacuum of the engine 13 is admitted via a tube 33 to a nozzle 33A which is closed or opened by a valve element 34A fast on a diaphragm 34 which defines a regulating chamber 35 on one side thereof and an atmospheric chamber 36 opening to the atmosphere pressure on the opposite side thereof. Springs 37 and 38 bias the diaphragm 34 in the opposite directions.

The regulating chamber 35 which has the nozzle 33A communicating with the source of intake manifold vacuum has another tube 39 provided with an orifice 40. The tube 39 is formed with a nozzle 39A cooperating with a valve element 42 actuable by a solenoid 41. From a portion of the tube 39 between the orifice 40 and the nozzle 39A, a vacuum line 43 is branched off and leads to the vacuum chamber 26 of the flow control valve 20.

The valve element 42 is fast on a diaphragm 44 and cooperates with the solenoid 41 such that when the solenoid 41 is energized, the valve element 42 opens the nozzle 39A, admitting atmospheric air into the vacuum line 43, while when it is deenergized, the valve element 42 closes the nozzle 39A due to the bias of the diaphragm 44, allowing the same vacuum as in the regulating chamber to develop in the vacuum line 43.

A temperature sensor 45 is disposed in the inlet passage 18 at a portion downstream of a junction where the branch passage 16 joins with the inlet passage 18. The sensor output of the sensor 45 is fed to the controller 31.

The controller 31 also receives output signals from an intake manifold sensor 46 and an engine speed sensor 47. The output signals of these sensors 46 and 47 are used to detect engine operating condition.

Figure 6:
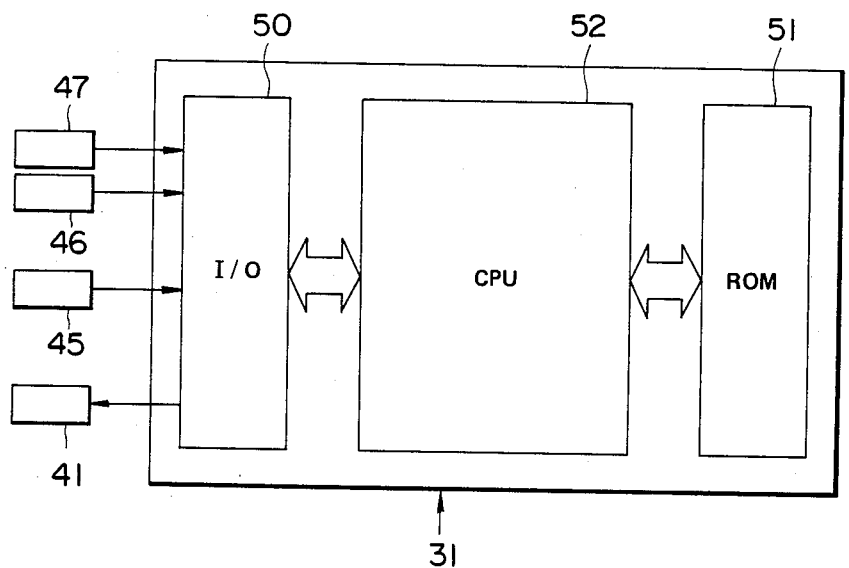
FIG. 6 is a diagram showing one example of a controller.
Figure 7:
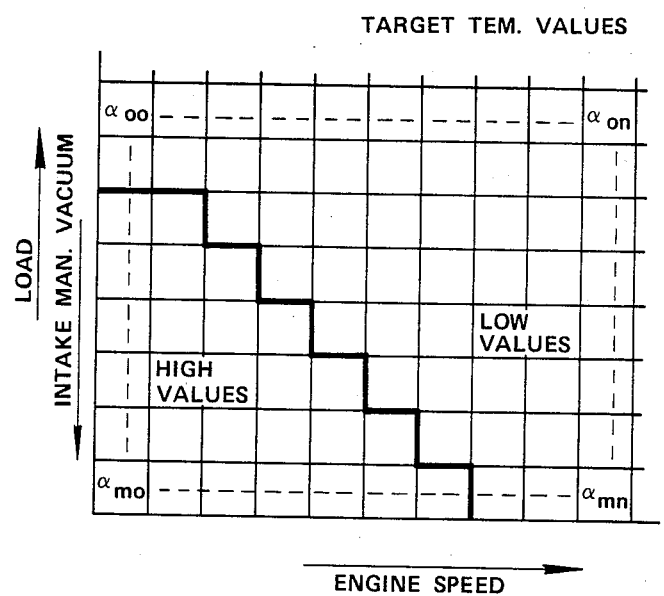
FIG. 7 is a graph showing one example of a table containing various target coolant temperature values.

The controller 31 is mainly constructed of a microcomputer as shown in FIG. 6. It comprises an input/output interface 50, a ROM 51 which stores target coolant temperature values versus operating conditions arranged in a table as shown in FIG. 7, and a CPU 52.

FIG. 8 shows a flowchart of an operation routine of the microcomputer. In steps P1, P2 and P3, sensed actual coolant temperature TW1, intake manifold vacuum Pm and engine speed RPM are read, respectively, from th corresponding sensors 45, 46 and 47. In step P4, based on the intake manifold vacuum Pm and the engine speed RPM read in the previous steps, a target coolant temperature TW2 is retrieved by table look-up of FIG. 7. In step P5, the actual coolant temperature TW1 is compared with the target coolant temperature TW2. If TW1 is greater than or equal to TW2, the control goes to step P7 where electric current is allowed to pass through the solenoid 41 of the vacuum regulator 21 so as to energize same, whereas if TW1 is less than TW2, the control goes to step P6 where the supply of electric current to the solenoid 41 is cut off so as to deenergize same.

The supply of electric current to the solenoid 41 causes the valve element 42 to open the nozzle 39A, allowing the atmospheric air to enter via the vacuum line 43 into the vacuum chamber 26 of the flow control valve 20, decreasing the vacuum in the vacuum chamber 26. This causes the control valve 20 to increase opening degree thereof. As the control valve 20 increases its opening, the flow rate of coolant passing through the radiator 14 increases, thus bringing down the coolant temperature of the coolant to be supplied to an engine main body 13. When the electric current supply is cut off, the nozzle 39A is closed and the vacuum in the vacuum chamber 26 is increased. This causes the control valve 20 to decrease opening degree thereof, decreasing the flow rate of coolant passing through the radiator 14, thus allowing the coolant temperature to rise.

The system constructed as above operates as follows:

In response to the signals supplied from the intake manifold vacuum sensor 46 and the engine speed sensor 47, the controller 31 retrieves a target coolant temperature by table lock-up of the table shown in FIG. 7.

By looking up the table shown in FIG. 7, when the engine operates at low speeds with low load, a high temperature is set as the target coolant temperature. On the other hand, a low temperature is set as the target coolant temperature when the engine operates at high speeds with high load. Even with the same engine load, the target coolant temperature is shifted toward low temperature side as the engine speed increases, and the amount of shift from the high temperature side toward the low temperature side increases as the engine load increases.

After retrieving the target coolant temperature, the controller 31 compares the sensed actual coolant temperature TW1 with the target coolant temperature TW2.

If the target coolant temperature TW2 is set high, for example, as is required for operation at low speed with low load, the actual coolant temperature TW1 is lower than the target coolant temperature TW2. Thus, the controller 31 cuts off the supply of current passing through the solenoid 41, allowing the valve element 42 to close the nozzle 39A, admitting the vacuum within the regulating chamber 35 to the vacuum chamber 26, causing the diaphragm 25 to urge the valve element 23 against the return spring 28, decreasing the opening degree of the control valve 20 or rendering same zero.

This causes a decrease in flow of coolant passing through the radiator 14, resulting in an increase in temperature of the coolant circulating through a water jacket (not shown) in the engine main body 13.

This temperature is sensed by the coolant temperature sensor 45 and the sensor output is fed back to the controller 31.

If the actual coolant temperature TW1 exceeds the target coolant temperature, the controller 31 allows the supply of current to the solenoid 41, causing the valve element 42 of the vacuum regulator 21 to open the nozzle 39A, decreasing the vacuum supplied to the flow control valve 20. This allows the return spring 28 to push the valve element 23 of the control valve 20 in the valve opening direction, disengaging the valve element 23 from the seat portion 22. Thus, the flow rate of coolant passing through the radiator 14 increases, resulting in a drop in the coolant temperature. On the contrary, if the actual temperature TW1 drops again below the target coolant temperature TW2, the control valve 20 is closed again. After repeating these actions, the actual coolant temperature approaches the target coolant temperature optimum for low speed low load engine operation.

When, on the other hand, the engine operates at high speed with high load, the target coolant temperature TW2 is shifted toward the low temperature side.

Under this condition, the controller 31 allows the supply of current to the solenoid 41 of the vacuum regulator 21 so that the opening degree of the flow control valve 20 increases. This causes an increase in flow rate of coolant passing through the radiator 14, thus lowering the temperature of the coolant.

Since, owing to the feedback control, the opening degree of the control valve 20 is varied if the actual coolant temperature TW1 deviates from the target coolant temperature TW2, the coolant temperature is adjusted to a desired value with good accuracy even if the desired value changes as the engine operating condition changes. This may be readily appreciated from graphs shown in FIG. 9.

Since, in this embodiment, the flow control valve 20 is disposed on the discharge side of a water pump 17, the occurrence of cavitation which may be created by a lack in draw-in force by the water pump 17 can be prevented.

Although, in this embodiment, the solenoid actuating signal supplied to the vacuum regulator 21 is of ON-OFF form, the solenoid 41 may be actuated by varying ON-OFF duty of electric pulses with a predetermined frequency supplied to the solenoid 41. In the latter case, the coolant temperature may be adjusted to any target coolant temperatures with less deviation.

Figure 10:
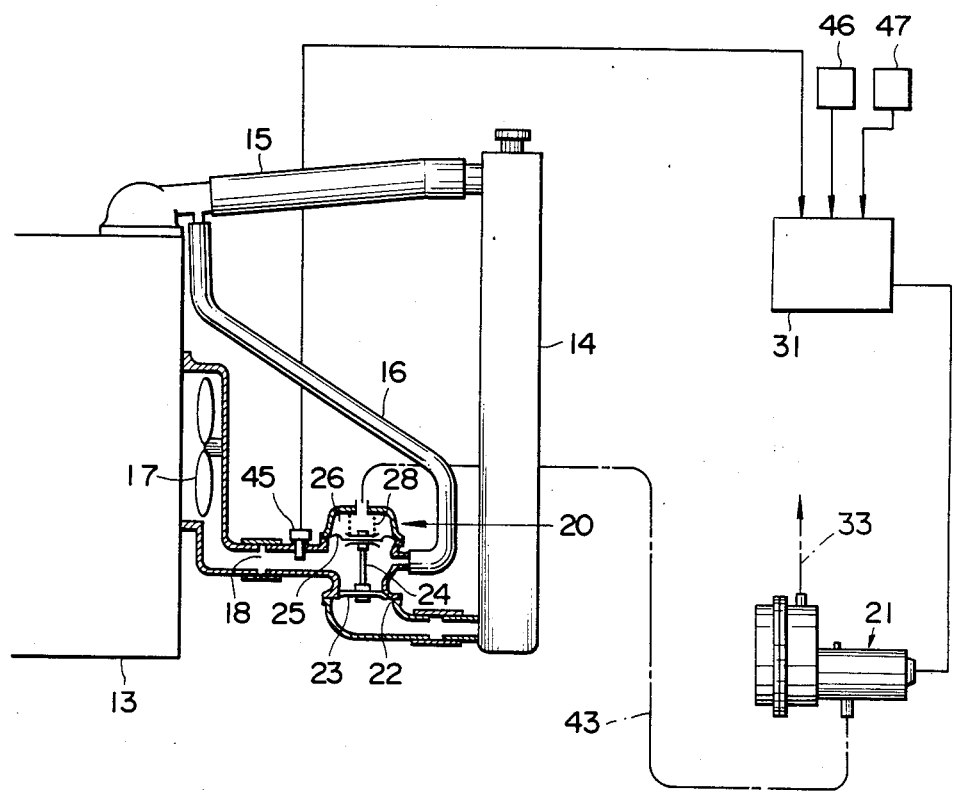
FIG. 10 is a similar view to FIG. 5 showing a second embodiment.

Describing the second embodiment shown in FIG. 10, a flow control valve 20 is disposed in an inlet passage 18 at a portion upstream of a junction where a bypass passage 16 joins with the inlet passage 18.

In this case, similarly to the before mentioned embodiment, the opening degree of the control valve 20 is feedback controlled in response to the output of a temperature sensor 45. Thus, the coolant temperature can be maintained at the optimum temperature for any operating condition.

In this second embodiment, although a valve element 23 of the flow control valve 20 is subjected to a draw-in pressure of a water pump 17 and biased in the valve opening direction, the force derived from the draw-in pressure of the water pump 17 is offset because the intake manifold vacuum is applied to a diaphragm 25, having substantially the same pressure acting area as that of the valve element 23, in order to create a force in a direction opposite to the valve opening direction.

Thus, the flow control valve 20 operates in good response to the control vacuum supplied to a vacuum chamber 26 without increasing the effective pressure acting area of the diaphragm 25. Besides, the opening degree of the control valve 20 is less affected by a variation in the draw-in pressure due to a variation in revolution speed of the water pump 17.

As described in the preceeding, according to the present invention the coolant temperature can be adjusted with good accuracy to different target coolant temperatures in response to different operating conditions, thus making it possible to improve fuel economy and exhaust characteristic without deteriorating the operating performance of the engine.

Besides, since the temperature sensor is provided independent of the flow control valve, the flow control valve can be actuated with good accuracy even if it is mounted in the inlet or the outlet of the coolant circulating circuit. Further, since there is no requirement on the structure of the control valve, any type of flow control valve may be used. Thus, a flow control valve with a diaphragm type actuator may be employed, making it possible to reduce the size of a valve actuator of a flow control valve.

We claim:

1. A system for controlling temperature of coolant circulating through an engine main body of an internal combustion engine having a plurality of operating conditions, comprising:
    a coolant circulating circuit including a radiator, an outlet passage passing a relatively hot coolant from the engine main body to said radiator, an inlet passage passing a relatively cool coolant from said radiator to the engine main body and a bypass passage having one end connected to said outlet passage and an opposite end connected to said inlet passage for passing the relatively hot coolant directly to the relatively cool coolant bypassing said radiator;
    a temperature sensor means, disposed in said coolant circulating circuit, for sensing an actual coolant temperature of the coolant in said coolant circulating circuit and generating an actual coolant temperature indicative signal indicative of the sensed actual coolant temperature;
    means for storing coolant temperature values corresponding, respectively, to said plurality of operating conditions of the engine;
    means for detecting a present operating condition of the internal combustion engine and generating an operating condition indicative signal indicative of the detected operating condition;
    means for retrieving the coolant temperature value corresponding to the detected operating condition of the engine indicated by said operating condition indicative signal and generating a target coolant temperature indicative signal indicative of said retrieved coolant temperature value;
    means for comparing said actual coolant temperature indicative signal with said target coolant temperature indicative signal and generating a result indicative signal indicative of the result of said comparison; and
    means responsive to said result indicative signal for controlling the flow rate of coolant passing through said radiator in such a manner as to decrease a difference between said actual coolant temperature indicative signal and said target coolant temperature indicative signal.

2. A system as claimed in claim 1, wherein said controlling means includes:
    a flow control valve having a valve element disposed in said coolant circulating circuit and an actuator, with a diaphragm defining a vacuum chamber, for operating said valve element in response to a control vacuum in said vacuum chamber;
    a vacuum regulator for generating said control vacuum in response to an electric signal supplied thereto; and
    a controller for generating said electric signal.

3. A system as claimed in claim 2, wherein said valve element of said flow control valve is disposed in said outlet passage at a portion upstream of a junction where said bypass passage is connected to said outlet passage, and said temperature sensor is disposed in said inlet passage at a portion downstream of a junction where said bypass passage is connected to said inlet passage.

4. A system as claimed in claim 2, wherein said valve element of said flow control valve is disposed in said inlet passage at a portion upstream of a junction where said bypass passage is connected to said inlet passage, and said temperature sensor is disposed in said inlet passage at a portion downstream of said valve element of said flow control valve.

5. A system as claimed in claim 1, wherein said present operating condition detecting means includes an engine speed sensor means for sensing engine speed and an intake manifold sensor means for sensing intake manifold vacuum of said engine.

6. A system as claimed in claim 1, wherein said present operating condition detecting means detects at least three load states of said engine.

7. A system as claimed in claim 1, wherein said means for controlling the flow rate of coolant passing through said radiator comprises a bypass valve positioned to control the flow of fluid through said bypass passage and means for controlling the opening state of said valve in response only to said result indicative signal.

* * * * *